Sept. 29, 1953          K. W. McLOAD          2,654,077

MULTITERMINAL SEISMIC CABLE CONNECTOR SYSTEM

Filed April 6, 1950

KENNETH W. McLOAD
INVENTOR.

BY D. Carl Richards

AGENT

Patented Sept. 29, 1953

2,654,077

UNITED STATES PATENT OFFICE 2,654,077

MULTITERMINAL SEISMIC CABLE CONNECTOR SYSTEM

Kenneth W. McLoad, Dallas, Tex., assignor, by mesne assignments, to Socony-Vacuum Oil Company, Incorporated, New York, N. Y., a corporation of New York Application April 6, 1950, Serial No. 154,305

6 Claims. (Cl. 339—147)

This invention relates to seismic prospecting and more particularly to a detecting system rapid and efficient in operation with respect to establishing and maintaining electrical circuits from seismometers to a recording station.

Ordinarily seismometers are set out at selected points or stations along a traverse in an array termed a spread and are connected in circuit with amplifying-recording channels located at a recording station to detect and record seismic waves. In some areas, it has been found necessary to utilize large numbers of seismometers at each station, oriented in an array usually selected as a result of tests in that area or dictated by experience or preference of individual operators. Whether the number of seismometers be large or small, there must be provided some means of assuring that the seismometers are all connected to associated circuits with a positive low resistance connection and in proper polarity in order to record a plurality of signals so related that they may be compared one with another. Operation over rough terrain places an extreme burden on the equipment used, and in repeating the same operation at each of a plurality of locations in a given area, wear and breakdown of equipment becomes extremely costly. Team work among personnel leading to most efficient and rapid operation is not even possible without proper equipment. Setting out seismometers and establishing circuits to them, as to assure that signals therefrom are properly received and recorded is a most important but nevertheless, even under the most favorable circumstances, a time consuming phase of seismic surveying. The present invention is directed to a system for greatly simplifying certain phases of the operation.

In accordance with the present invention, there is provided a system for interconnecting a plurality of seismometers and a recording system which includes, at each geophone station along a multi-conductor cable, a pair of open-ended tubular jacks spaced one from the other in axial alignment with their axes parallel to the axis of the cable. A moulded rubber jacket anchors each jack to the cable, and electrical conducting means interconnects each jack and a selected conductor in the cable. The outer configuration of the jack-cable structure is streamlined for unobstructed drag movement along the earth's surface. Leads from associated geophones are terminated in plugs complementary with the cable jacks.

For a more complete understanding of the invention, reference may now be had to the following description taken in conjunction with the accompanying drawings in which.

Figure 1:
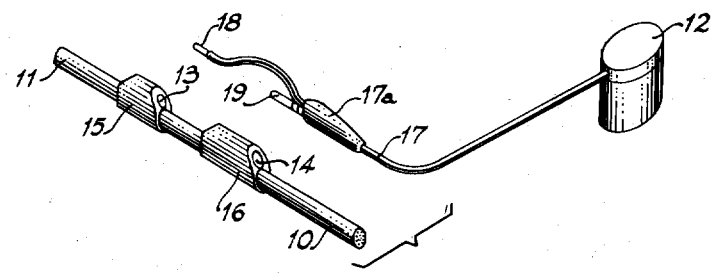
Fig. 1 is an isometric view of a cable and geophone at one detecting station.

Referring now to Fig. 1, there is illustrated a short segment of a multiconductor cable 10 which extends beyond the end 11 to a recording unit (not shown) ordinarily mounted in and carried by a truck. Cable 10 may be attached to a reel on the recording truck or may be carried by and laid out along a selected traverse from an independent cable truck which may be employed in addition to a recording truck for carrying out the seismic operations.

It is necessary to connect seismometers such as the seismometer 12 to a selected or predetermined pair of conductors in cable 11 for transmission of electrical signals corresponding with the detected seismic waves to the recording unit. In connecting the seismometers to their respective cables, it is desirable to provide a connecting system which for repeated operations will permit the seismometer to be connected with but one polarity, the polarity being the same as the polarity of all of the other seismometers associated with the cable. After completing measurement at one location, it is then often desirable to be able to tow cable 10 to a new location or to be able to reel it in to the recording truck in the interval that the several seismometers associated therewith are picked up.

Figures 2, 3:
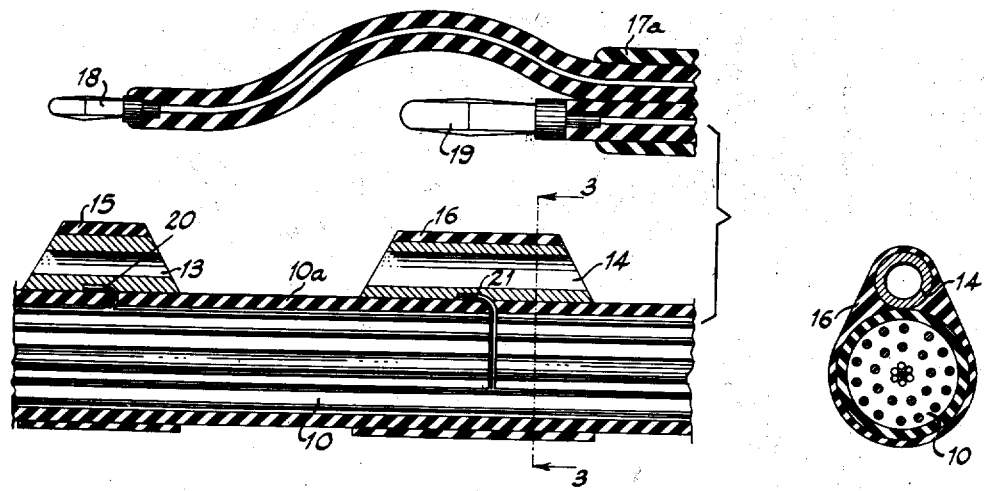
Fig. 2 is a cross-sectional view of the connecting system taken through the axis of the cable.
Fig. 3 is a cross section taken along line 3—3 of Fig. 2.

In accordance with the present invention, operations as above outlined may be readily carried out with assurance that the seismometers will be connected with proper polarity and that they may be disconnected, when desired, by merely dragging the cable from the end 11. As illustrated in Figs. 1-3, a pair of jacks 13 and 14 formed of hollow cylindrical tubes are mounted on the periphery of the cable 10 with their axes in alignment and their peripheries tangent to the cable 10. Molded rubber jackets 15 and 16 encircle both the jacks 13 and 14 and adjacent portions of cable 10 firmly to affix the jacks to the cable to permit drag movement of the cable with minimum possibility that the connecting means (jacks) will be damaged thereby. The molded jackets 15 and 16 preferably are vulcanized onto the rubber sheath 10a of the cable 10 to form a strong unitary structure. The ends of the jacks 13 and 14 are beveled and are attached to the cable so that their short edge is remote from the cable to minimize the rate of change of overall cable cross section at the location of each jack to give the system a more streamlined form, thereby to minimize the resistance to drag movement.

A cable 17 leading from the seismometer 12 includes two conductors of different lengths forming together with the sensitive element of seismometer 12 a circuit which is terminated in plugs 18 and 19. The plugs 18 and 19 are adapted to be inserted tip first into and frictionally retained in the jacks 13 and 14 respectively. In order to prevent the connection between the seismometer 12 and the cable 10 in any manner other than a preferred connection as hereinafter described, the distance between the plugs 18 and 19 is fixed by the difference in length of the conductors of cable 17. A jacket 17a is molded around the cable 17 closely adjacent the base of plug 19 and clamps the two conductors of cable 17 adjacent the plug 19 to prevent a separation between plugs 18 and 19 greater than a predetermined maximum distance. The difference in length of the two conductors of cable 17 is then great enough to sufficiently space the plugs 18 and 19 for insertion into the spaced apart jacks 13 and 14. The molded jacket 17a limits the maximum spacing between the plugs 18 and 19 so that they may be inserted into their respective jacks from but one direction. The direction is determined by the relative positions of the jacks and plugs. For example, jack 13 cooperating with plug 18 is positioned closer to the tow end of cable 10 than is the jack 14 which receives plug 19. Thus the plugs 18 and 19 must be inserted into jacks 13 and 14 in direction toward the end 11. As will hereinafter be pointed out, it will be advantageous to separate the plugs 18 and 19 a distance greater than the spacing between the jacks 13 and 14, this latter distance being substantially equal to the length of the plugs.

In fabricating a cable for use in a given area, pairs of plugs as illustrated in Fig. 2 are anchored to the periphery of the cable at intervals corresponding with the desired seismometer spacing for the area to be investigated. If a great number of seismometers is required for each station, a plurality of pairs of jacks 13 and 14 would be vulcanizingly attached to cable 10 and connected to the same pair of conductors for transmission of the summation of the plurality of signals therefrom to the recording unit. In any case, regardless of the spacing between the several pairs of jacks fastened to the cable 10, it is preferred that the jack corresponding in geometrical configuration or otherwise cooperating with the plug extending the greater distance from the seismometer 12 be positioned on the cable 10 closer to the drag end than its companion jack. In the modification of the invention illustrated in Figs. 1–3, the plug 18, closest the drag end 11, is smaller in diameter than plug 19 and cooperates with the jack 13 of smaller internal diameter than the jack 14. With this construction, it will be possible to connect the seismometer 12 to the cable 10 in but one polarity determined solely by the geometric configuration of the plugs and jacks.

In operation, a set of seismometers such as the seismometer 12 are set out along a spread and are usually buried wholly or in part in the loose surface material as to insure faithful transfer of seismic waves thereto. Cable 10 laid out along the spread has sets of jacks at spaced intervals and in number corresponding to the intended spacing and number of seismometers. In preferred form, the jack 13 of smallest diameter corresponding with the plug 18 most remote from the seismometer 12 is positioned ahead of the larger diameter jack 14. The seismometer plugs are then inserted into the jacks for completion of the respective seismometer circuits. Since the distance between plugs 18 and 19 is fixed by jacket 17a, and the jacket 17a is formed very close to plug 19, it becomes necessary to insert both plugs into their associated jacks in a direction toward which the cable will be towed or reeled in to a recording truck. Thus, when it is desired to transfer the spread to a new location, a truck at the drag end 11 of the cable 10 may merely tow the cable forward to a new location or wind it onto a reel as desired.

Since the plugs 18 and 19 are inserted into their respective jacks in the direction of drag movement, they will automatically be disconnected as the cable 10 is moved. Further, since the plugs 18 and 19 are spaced a greater distance apart than the jacks 13 and 14, initial movement of the cable will loosen the plug 19 in jack 14 before a force is exerted between plug 18 and jack 13. Thus, the possibility that the geophone might remain coupled, dragged from its plant and dropped at random along the spread is decreased by a factor of two. The problem, of course, is to provide a contact making system in which the forces exerted between the elements thereof are great enough to insure low electrical resistance and small enough as not to preclude uncoupling when the cable 10 is towed. The above-described relationship between plugs and jacks, the spacing therebetween and their orientation make possible the use of twice as much force between the contact elements than would otherwise be permissible for the same assurance that the system will be uncoupled when the cable is towed.

The present invention will be utilized to advantage in systems utilizing a single seismometer at each location just as in multiple geophone systems. The system is free of appended elements which are readily torn off of the cable and thus impede an exploration program. The problem of assuring low resistance contact between seismometer leads and the cable is minimized. Ordinarily, dirt, mud, and other debris will collect in jacks appended to a cable 10 and make it difficult to establish a low resistance connection. In the present invention, the tubular jacks may be readily cleaned by merely brushing mud and debris therefrom.

It will be evident that jacks other than the tubes of Figs. 1–3 could be utilized. It is necessary only to have them of different geometrical properties so that the proper plugs only will be operative when plugged therein.

While preferred embodiments of the invention have been described, it will be understood that further modifications may be made without departing from the spirit and scope of the invention as set forth in the appended claims.

What is claimed is:

1. In a seismic prospecting system comprising a plurality of seismometers for detecting seismic energy and a cable adapted for drag movement comprising at least one pair of conductors and a protective insulating sheath for the transmission of the output of a plurality of seismometers to a recording and amplifying unit, the improvement in means for electrically interconnecting a seismometer with a pair of conductors within the cable which comprises a pair of insulated seismometer leads of different lengths terminating in conductive plugs of different diameters, a pair of conductive jacks having differing internal diameters adapted to receive and frictionally retain said plugs, insulating jackets surrounding each of said jacks and an adjacent portion of the cable sheath for protectively retaining said jacks attached to said cable spaced apart a distance less than the difference in length of said leads but at least one-half said difference along the axis of said cable with their principal axes parallel to the axis of said cable, and electrical conductors for interconnecting said pair of jacks to a pair of the conductors within the cable.

2. The apparatus of claim 1 wherein the jack spaced farther from the end of the cable where a dragging force is to be applied cooperates with and frictionally contacts the plug affixed to the shorter of the seismometer leads.

3. In a cable system having protective sheath inclosing a plurality of pairs of conductors to be connected respectively to seismometers at spaced points along the length thereof, an improved means for completing a circuit from a pair of said conductors to one of said seismometers comprising in combination a pair of plug receiving receptacles spaced axially along said cable, a moulded jacket encircling each of said receptacles and said cable and bonded to said sheath, said receptacle means having different geometrical configurations, means electrically connecting said receptacles to conductors in said cable, and plug means of correspondingly different geometrical configuration electrically connected to said seismometer and spaced one from the other a distance greater than the spacing of said receptacles by an amount approximately equal the length of said plug means closest said seismometer.

4. In a cable system having a protective sheath inclosing a plurality of pairs of conductors to be connected respectively to seismometers spaced along the length thereof, an improved means for completing a circuit from pairs of said conductors to said seismometers comprising a pair of plugs and jacks of different geometrical configuration disposed adjacent said cable at each seismometer location, means for connecting different conductors of said cable to each of said jacks, moulded jackets encircling said jacks and said sheath to anchor said jacks to said sheath in spaced apart relation, and two conductors extending from said seismometer and each terminated in one of said plugs, with one of said conductors exceeding the other in length by an amount approximately equal to the spacing between said jacks plus the length of said plug closest said seismometer.

5. In a seismic prospecting system comprising a seismometer for detecting seismic energy and a cable adapted for drag movement including a pair of conductors and a protecting insulating sheath for transmission of the output of said seismometer to an amplifying and recording unit, the improvement in means for electrically connecting said seismometer to said conductors which comprises a pair of frictionally contacting conductive jacks, means for connecting said jacks to said conductors, means for attaching said jacks to said cable in a fixed relation spaced apart axially along said cable, a pair of leads connected to said seismometer, a pair of plugs respectively connected at their bases to said leads, and means adjacent the base of the plug on a first of said leads for securely fixing the other of said leads thereto with said plugs spaced apart a distance approximately equal the spacing between said jacks plus the length of said plug on said first of said leads.

6. In a seismic prospecting system comprising a seismometer for detecting seismic energy and a cable adapted for drag movement from a terminal end including a pair of conductors and a protecting insulating sheath for transmission of the output of said seismometer to an amplifying and recording unit, the improvement in means for electrically connecting said seismometer to said conductors which comprises a pair of unlike frictionally contacting conductive jacks, means for connecting said jacks to said conductors, means for attaching said jacks to said cable in a fixed relation spaced apart axially along said cable, a pair of leads connected to said seismometer, a pair of plugs respectively connected at their bases to said leads and adapted for insertion tip first into said jacks, and means on a first of said leads and adjacent the base of the plug complementary with the jack positioned most remote from said terminal end for securely fixing the other of said leads with said plugs spaced apart a distance approximately equal the spacing between said jacks plus the length of said plug on said first of said leads.

KENNETH W. McLOAD.

References Cited in the file of this patent
UNITED STATES PATENTS

| Number | Name | Date |
|---|---|---|
| 1,094,156 | Lowe | Apr. 21, 1914 |
| 1,981,753 | Pearson | Nov. 20, 1934 |
| 2,253,830 | Winterhalter | Aug. 26, 1941 |
| 2,428,214 | Gorey | Sept. 30, 1947 |

FOREIGN PATENTS

| Number | Country | Date |
|---|---|---|
| 395,994 | France | Mar. 25, 1909 |